Dec. 11, 1945.  R. PASH  2,390,614
METHOD OF AND APPARATUS FOR MAKING ANNULAR ARTICLES
Filed June 28, 1941   2 Sheets-Sheet 1
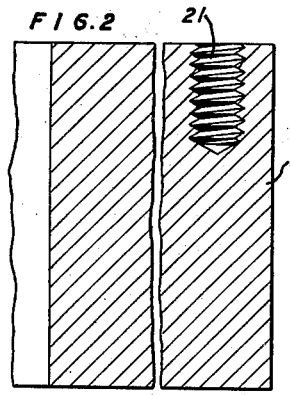
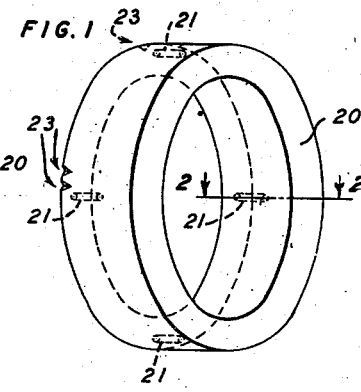
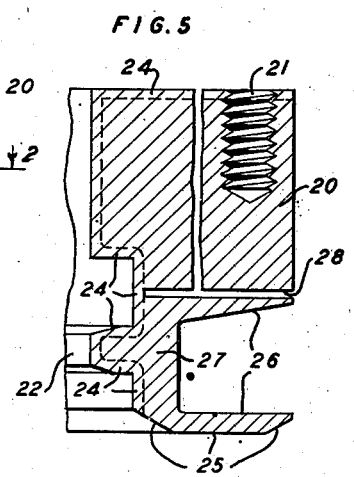
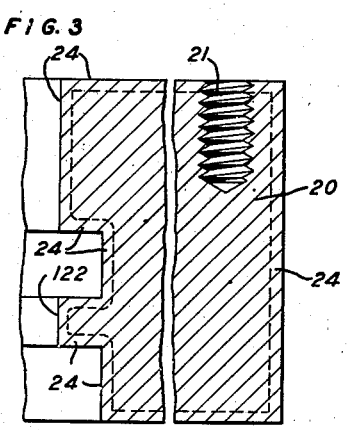
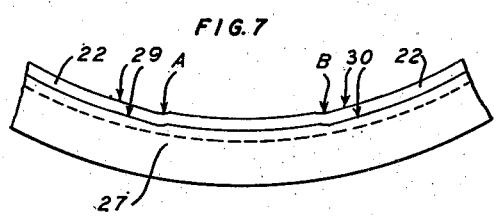
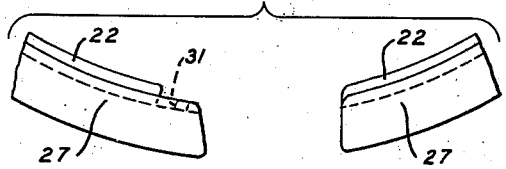
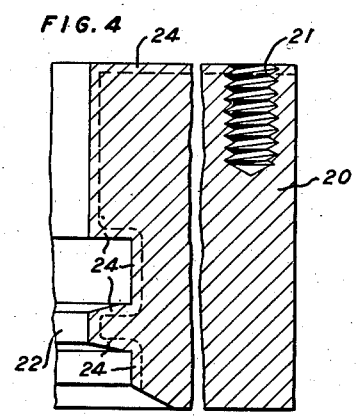
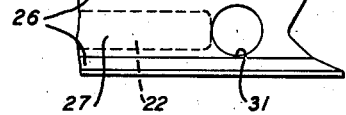
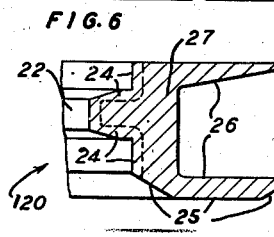
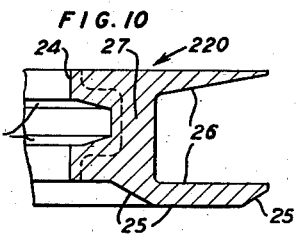
INVENTOR
R. PASH
BY
E. R. Nowlan
ATTORNEY Dec. 11, 1945.  R. PASH  2,390,614
METHOD OF AND APPARATUS FOR MAKING ANNULAR ARTICLES
Filed June 28, 1941  2 Sheets-Sheet 2
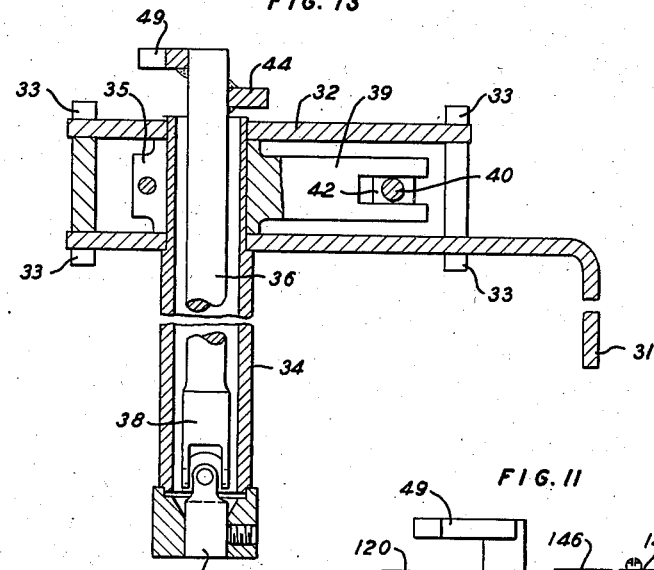
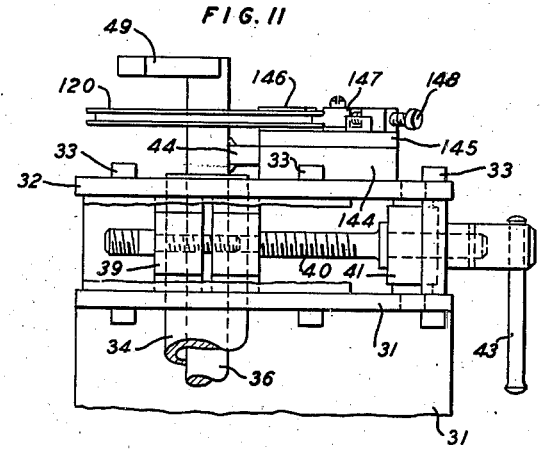
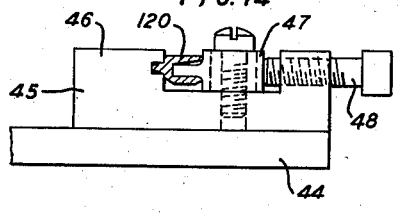
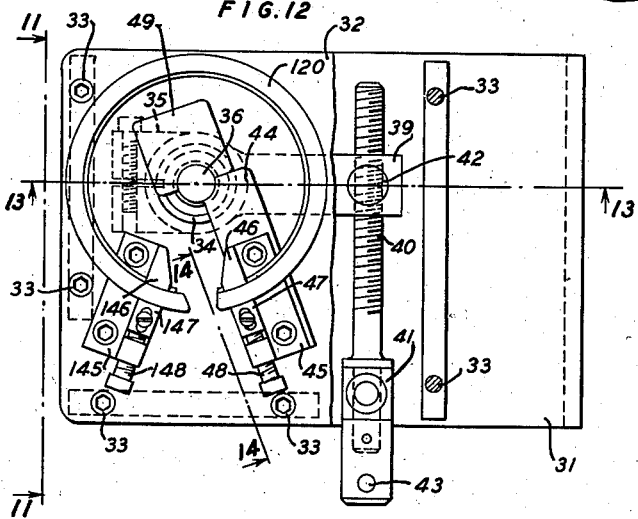
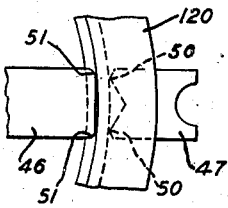
INVENTOR
R. PASH
BY
E.R. Nowlan
ATTORNEY Patented Dec. 11, 1945

2,390,614

UNITED STATES PATENT OFFICE 2,390,614

METHOD OF AND APPARATUS FOR MAKING ANNULAR ARTICLES

Robert Pash, Roselle, N. J., assignor to Western Electric Company, Incorporated, New York, N. Y., a corporation of New York Application June 28, 1941, Serial No. 400,311

5 Claims. (Cl. 29—156)

This invention relates to a method of and apparatus for making annular articles, and more particularly to a method of and apparatus for making annular articles of extreme accuracy of dimension and circularity.

Toroidal coils, i. e. coils having a toroidal or doughnut-shaped core of magnetic material with a winding of insulated electrical conductor strands wound thereon in turns passing through the central aperture of the core, have innumerable applications in the electrical arts, especially in the communications arts. In U. S. Patents 2,230,363 and 1,994,661 issued on February 4, 1941, and March 19, 1935, respectively, upon applications by the present inventor, a machine for winding toroidal coils is described and disclosed in detail. In such a machine, a peripherally grooved, incompletely annular spool, containing a supply of wire to be wound, is interlinked with the core to be wound. Winding means take the wire from the spool ring and lay it on the core and in so doing cause the spool ring to rotate about its axis. The spool ring is supported to be thus rotatable upon a plurality of relatively small grooved sheaves within the ring and engaging a corresponding rib formed on the inner periphery of the ring. In operation the ring may run at speeds upward of 800 R. P. M. in one direction to wind a supply of wire in the groove of the ring and then in the other direction to wind the wire from the ring upon a core. Copper wire as fine as No. 40 A. W. G., i. e., about 0.003 inch in diameter, may be used in some instances for the winding. Obviously the spool ring, in dealing with such fragile strands, must run with extreme smoothness to avoid stretching or even rupturing the wire. The ring, as noted above, is necessarily an incomplete annulus so that it may be interlinked for winding with the completely annular toroidal coil to be wound, and removed therefrom after the winding is completed. As the ring runs in operation, its ends at the gap in it must engage and leave the several supporting sheaves without shock and the ring must run without chatter on the sheaves, and also without binding of its rib in the grooves of the sheaves. It is evident, therefore, that the ring must be made to have originally and to maintain and retain under service an internal diameter of extremely accurately predetermined value and uniformity in all radial directions and also be conditioned at its ends near the gap to lead upon and from the sheaves shocklessly.

An object of the present invention is to provide a method of making a spool ring formed with extreme accuracy as described and peculiarly adapted to maintain against operating stresses and retain against operating wear its inner peripheral form unchanged.

Another object of the invention is to provide a simple, reliable and efficient apparatus for use in making such a ring.

With the above and other objects in view, the invention may be embodied in a method of making an incompletely annular article of steel or other hardenable metal which comprises steps of forming the inner peripheral surface of an annular blank to have approximately the form of the inner peripheral surface desired, treating the entire surface of the partially formed blank to render the material of the surface portion of the blank but not the body thereof hard and stiff, grinding away the entire hardened surface portion except from the inner periphery, grinding the inner periphery to final form without removing all of the hardened portion therefrom, machining the unhardened body to final form, removing a sector from the annulus thus made, and adjusting the diameter of the incompletely annular ring by exerting a pure bending stress thereon distributed uniformly along the length thereof.

In a subordinate or ancillary phase, the invention may be embodied in an apparatus having means to grip an incompletely annular body at the two ends thereof only, and means to move the gripping means to exert a pure bending stress on such a body held therein and to distribute such stress uniformly along the body.

Other objects and features of the invention will appear from the following detailed description of an embodiment thereof taken in connection with the accompanying drawings in which the same reference numerals are applied to identical parts in the several figures and in which Fig. 1 is a perspective view of a cylindrical annular blank from which is to be made a spool ring for a toroidal coil winding machine;

Fig. 2 is a section on the line 2—2 of Fig. 1 on an enlarged scale;

Fig. 3 is a similar view after the first forming step and hardening step;

Fig. 4 is a similar view after the grinding;

Fig. 5 is a similar view after the machining;

Fig. 6 is a similar view after the cutting off operation;

Fig. 7 is a partial side view, on a smaller scale, of the article of Fig. 6;

Fig. 8 is a similar view after the gap has been cut;

Fig. 9 is a reverse plan view of the annulus end at the left of the gap in Fig. 8, on an enlarged scale;

Fig. 10 is a view similar to Fig. 6 of a modified form of ring;

Fig. 11 is a view in side elevation of the upper portion of the tangential stress exerting apparatus;

Fig. 12 is a plan view of the showing of Fig. 11;

Fig. 13 is a vertical central section of the axial elements complete, shown in part in Fig. 11, on the line 13—13 of Fig. 12;

Fig. 14 is a detached enlarged view on an enlarged scale on the line 14—14 of Fig. 12 of one of the gripping jaws; and Fig. 15 is a partial plan view of the showing of Fig. 14 with a portion of a ring in the jaws.

To describe the invention as herein disclosed, the starting point may be a blank 20, as shown in Fig. 1, from which a spool ring for a toroidal coil winding machine is to be made. This blank is a cylindrically annular body of suitable material and of dimensions as required by the procedure described below. Preferably the material is one of the alloys of iron or steel commercially known as "nitralloy," of which a typical representative has approximately the following composition: carbon 0.30% to 0.40%, manganese 0.40% to 0.60%, silicon 0.20% to 0.30%, aluminum 0.98% to 1.40%, chromium 0.98% to 1.40% and molybdenum 0.15% to 0.25%, and the balance iron except for minor impurities. These alloys are strong and tough and characterized by their capacity to absorb nitrogen and acquire a skin portion of considerable depth and of extreme hardness when heated in a nitrogenous atmosphere under suitable conditions of temperature and time. The remainder of a body of such alloy, within the hard skin produced by such nitriding, remains ordinarily tough and strong on cooling from the nitriding treatment. In other instances other suitable materials and treatments yielding analogous results might be employed, e. g. for some purposes the material might be a low carbon steel and the treatment ordinary case hardening by heating in bone-meal and charcoal.

The blank 20 as shown in Fig. 1 is homogeneously soft and untreated, and has a rectangular cross-section (Fig. 2) about twice the width, axially of the blank, of the finished ring (Fig. 6). A suitable number of holes 21 (here four) is made in the rear face of blank, parallel to its axis and suitably disposed about the annulus. These holes are drilled and tapped to enable the blank to be detachably secured on a face plate on a lathe, removed therefrom and replaced thereon in accurately the same position, as hereinafter described, by means of suitable screws not shown.

The blank having been thus secured in place on the face plate of a lathe (not shown), the inner periphery of the outer end of the blank is turned to have the form shown in Fig. 3, the dimensions of the rough rib 122 being a trifle larger over all than those of the finished rib 22 shown in Figs. 4, 5 and 6. Indicating marks 23 may be made on the blank after securing it on the face plate to correspond to similar marks on the attaching screws (not shown), in order that the same screws may be again entered into the same respective holes later.

The turned blank is then removed and, if of the preferred nitralloy above described, is heated in a suitable mixture of ammonia gas and air for the time and at the temperature required to nitride the blank to the required depth. In one particular instance of the kind generally herein described, this was done for about seventy hours at about 1000° F. This nitriding treatment produces on the blank a superficial portion or skin 24 of extreme hardness, whose thickness will depend upon the conditions of treatment and is predetermined to give the results as herein shown.

The blank having been cooled to room temperature is replaced on the same face plate of the same lathe by means of the same screws entering respectively the same holes 21 as before. Thus the axis of rotation of the blank in the lathe is now as nearly as possible the same as before. The skin 24 is far too hard to cut with cutting tools, and is ground away by suitable abrasive means. The skin 24 is thus removed entirely from the external periphery of the ring to be and from the outer end of the blank. The internal peripheral portion is carefully ground as shown in Fig. 4 to the exact cross-sectional dimensions desired in the finished ring, while the internal ring diameters are made very slightly smaller than desired, e. g. in one instance about 0.06 inch smaller in an internal diameter of about 3.46 inches.

The outer terminal surface 25 and the external peripheral groove 26 in the body 27 of the ring, which is to contain wire for winding a coil, are then given their final form by ordinary turning tools and methods, thus producing the stage shown in Fig. 5. A narrow parting tool or cutting off tool is then applied to cut the ring, as thus far completed, free from the rest of the blank down to the remaining interior peripheral skin 24, as shown in Fig. 5. The skin 24 is so brittle, usually, that when the cutting away of the supporting material back of it by the cutting off tool, as in the slot 28 shown in Fig. 5, is completed or nearly completed, the skin cracks substantially, though minutely jaggedly, following the peripheral course of the slot 28, and thus the ring is completely freed from the remnant of its blank. In some cases it may be necessary to cut the slot 28 and the skin 24 at the bottom of the slot with a narrow abrasive saw or wheel.

The last cut face of the ring is then ground smooth and true, producing the article shown in Fig. 6, with its cross-sectional form and peripheral surfaces generally entirely finished. This article is a complete ring, as nearly truly circular as is practicably possible. The inner peripheral surfaces of the rib 22 and adjacent thereto, which are destined to run in correspondingly grooved sheaves of a toroidal coil winding machine, are extremely hard and immune to wear. These otherwise excessively brittle nitrided surface portions are integrally united to and supported by the relatively soft and extremely tough and strong, unaltered body portion 27 of the ring in such fashion that even hair-cracking of the glass hard skin 24 is extremely rare in use.

The complete ring thus made, and shown in part in side elevation in Fig. 7, is then to have a sector cut out from A to B (Fig. 7) to provide the gap required in interlacing the ring in use with a completely annular toroidal core. Before this is done, and while the ring is still a complete and substantially perfect circle, the rib and adjacent surfaces are ground for a short distance on either side of the sector A—B, as indicated at 29 and 30, to make straight portions tangential to the respective circles. These provide means to lead the ring onto and from its supporting and driving sheaves shocklessly in use. The sector may be cut out preferably by an abrasive saw or wheel and the ends of the incomplete ring thus made are ground to the contours shown in Figs. 8 and 9. And finally a hole 31 is bored in the floor of the groove 26, as shown in Figs. 8 and 9, for fastening a wire end to the ring in use.

When the sector is cut out of the ring, internal stresses, probably due to the nitriding process, are released, and in most cases the ring springs open a little, increasing its internal diameter ordinarily by an amount in the neighborhood of 1.5% to 2.0%. The complete ring, before the sector is cut out, is therefore made to be about 1.7% less in diameter than the dimension desired in the finished incompletely annular ring. However, when the ring is completed as thus far described, it will be found to be substantially correct in circularity but incorrect in internal diameter by a few tenths of a percent, an error still too great to be tolerable in the apparatus in question.

The problem then arises of widening or narrowing the gapped ring to have a substantially correct diameter and to do this without materially altering the uniform circularity of its inner periphery. For this purpose recourse may be had to the apparatus disclosed in Figs. 11 to 15. This apparatus embodies an invention so closely related to and arising so narrowly out of the principal invention disclosed and claimed herein as to be entirely subsidiary thereto. Primarily it is two cooperating means to hold or grip an incomplete annulus at two points near the ends thereof and then to exert a pure bending stress distributed uniformly along the length of the annulus, by rotating one of the gripping means with respect to the other about an axis perpendicular to the plane of the ring, the said axis being free to float but constrained to remain substantially parallel to itself.

This device comprises a stationary supporting bracket 31 providing a horizontal table and an integral vertical member which may be gripped in a vise or otherwise secured for use. Above the horizontal part and spaced therefrom is a second horizontal member 32 rigidly secured to the member 31, as by bolts 33. A vertical hollow shaft 34 is mounted to be rotatable in the members 31 and 32 and is supported by a collar 35 secured on the shaft 34 between the members 31 and 32. A second shaft 36 is located within the shaft 34 and connected thereto at its bottom end by a universal joint 37, 38. The shaft 36 is of considerably less diameter than the inner diameter of the shaft 34 and so has a limited but not inconsiderable freedom of change of orientation within the shaft 34 relative thereto. There is, however, no rotation possible of shaft 36 with respect to shaft 34. A horizontal lever 39 integral with or rigidly secured to the collar 35 extends between the members 31 and 32, and may be actuated by a screw 40 to rotate the shaft 34 and therewith the shaft 36 in either direction. The screw 40 is mounted in a nut 41 pivotably held between the members 31 and 32 and also in a nut 42 pivotably mounted in the lever 39. A handle 43 is provided for turning the screw 40.

A horizontal arm 44 rigidly secured to the shaft 36 extends out over the top surface of the member 32. Near the outer end of this arm and on its top surface is mounted a removable base 45 carrying a pair of jaws 46 and 47, in radial apposition to each other. The jaw 46 is stationary on the arm 44, while the jaw 47 is radially adjustable toward and from the jaw 46 by means of a screw 48. A block 144 rigidly mounted on the top surface of the member 32 supports a removable base 145 carrying a pair of jaws 146, 147 and a screw 148 to actuate the jaw 147, all respectively identically like the elements 45, 46, 47 and 48. The shaft 36 also carries a counterbalance 49 adjusted to balance the arm 44 and its associated parts with respect to the center of the shaft 36. These parts are so proportioned and disposed that when the shaft 36 is vertical both pairs of jaws lie in one horizontal plane.

In operation, the jaws 47 and 147 are widely retired from their mates 46 and 146 respectively. A ring 120 to be adjusted as to diameter is placed in position with one end between the jaws 146 and 147 and some portion near the other end, between the jaws 46 and 47, the ring lying horizontally as shown in Figs. 11 and 12. The jaw 147 is then actuated by the screw 148 to clamp the left end of the ring (Fig. 12) firmly between the jaws 146 and 147. The screw 40 is then actuated to swing the arm 44 until the jaws 46 and 47 have the right end of the ring between them and the jaws 46 and 47 are closed to grip the right end of the ring. As best shown in Fig. 15, the jaw 47, which bears on the convex side of the ring, is formed to have two spaced, forwardly projecting, bluntly angular projections to make contact with the ring at the apices 50 only of these projections; while the jaw 46, which bears on the concave inner side of the ring, is rectangular with its corners rounded to make contact with the ring only at points 51 substantially opposite the apices 50. Thus the jaws have no tendency to alter the curvature of the ring.

If the ring is triflingly too large in diameter, the screw 40 may then be actuated to swing the arm 44 clockwise and thus rotate the hollow shaft 34 which in turn forces the shaft 36 to turn. The shaft 36 thus causes the lever 44, rigidly attached by the jaws 46 and 47 to the ring, to turn these jaws to exert a clockwise couple in the plane of the ring on the end of the ring held in these jaws. This effect at the same time generates an equal and opposite couple between the other end of the ring and the rigidly stationary jaws 146 and 147. Since the shaft 36 is free to move radially within the hollow shaft 34 in any direction, the two couples thus acting on the ring exert on the ring a pure bending stress which is distributed uniformly along the entire ring so as to be equally great at every part thereof between the two sets of jaws. The ring being of uniform cross-section and being thus stressed equally at all points, yields equally at all points and is reduced in diameter without there being produced any stress acting to alter the circularity of the ring. If the ring be too small the direction of the two couples may be reversed by actuating the screw 40 to swing the arm 44 counterclockwise. In either case the stress on the ring is imposed purely as a bending stress and is distributed evenly and equally throughout its entire length. The hard inner skin 24 of the ring yields elastically, and, were it not for the soft body 27, would spring back into its former size unchanged when released from the stress. However, the body 27 yields plastically so that the ring is permanently enlarged or diminished without change of circularity. The amount of movement of the jaws 46, 47 required to produce the desired permanent alteration of diameter of the ring cannot be accurately predetermined, but must be approached by a cut and try process.

By the procedure described and by using the apparatus described, an incompletely annular ring may be produced having a practically wearless inner running surface of unprecedentedly accurate circularity and diametral dimension.

As above described, the ring here in question has an interior diameter of about 3.46 inches, while the errors of diameter to be corrected are of the order of a few tenths of one percent. Thus the correction to be made in the instance at hand will be ordinarily less than at the most 0.03 inch of diameter or 0.09 inch of length of circumference. This quantity will represent more than liberally the maximum lateral motion of the top end of the shaft 36 in any radial direction within the shaft 34. Theoretically, the shaft 36 should be mounted within the shaft 34 to float radially therein but to remain always exactly parallel thereto. In applicant's disclosed structure, the difficulties entailed by inserting an additional universal joint between the shaft 34 and the top of the shaft 36 are obviated by making the shafts 34 and 36 so long (in the instant illustrative case about 10 inches or more) that the deviation from parallelism of the shaft 36 to the shaft 34 remains negligibly small in operation. Thus an essential feature of applicant's invention is to be found in the fact that, in operation, the apparatus described imposes on the end of the ring held in the jaws 146 and 147 a couple in the plane of the ring and acting about a fixed axis while simultaneously imposing on the end of the ring held in the jaws 46 and 47 a couple also in the plane of the ring and acting in the opposite rotary direction about a freely floating axis substantially parallel to the fixed axis, thus imposing on the ring as a whole a pure bending stress evenly distributed from end to end along the ring.

The ring 120, as thus far described, has a guide rib 22 protruding inwardly. The ring may also be made as shown at 220 in Fig. 10 with a groove 222 instead of the ring. In such case the forms of the jaws 46, 47 and 146, 147 will be correspondingly modified; and it is believed such modifications are too obvious to require illustration or detailed description.

The invention has been described in connection with an externally peripherally grooved, incompletely annular ring for use as a spool ring in winding toroidal coils. However, the invention is not thought to be necessarily so limited, but to be clearly present wherever an incomplete annulus of extreme uniformity of diameter is in question.

The embodiments particularly disclosed and described herein are illustrative and may be modified and departed from without departing from the spirit and scope of the invention as pointed out in and limited only by the appended claims.

What is claimed is:

1. The method of making an incompletely annular ring of extreme accuracy and uniformity of circularity, which comprises steps of shaping on one side of an annularly cylindrical blank of hardenable material a peripherally disposed portion of desired radially cross-sectional form and approximate predetermined diameter and accurate circularity, treating the blank to harden a relatively thin portion thereof over substantially the entire surface thereof, removing the hardened portion from the blank except over the said shaped peripheral portion, removing a sector from the ring to render the same annularly incomplete, holding one end of the ring, and moving the other end in an arcuate path to permanently set the ring to a desired diameter while retaining its circularity.

2. The method of making a spool ring for toroidal coil winding machines which comprises steps of turning the inner side of an annularly cylindrical blank of hardenable material to form therein a running surface of accurate circularity and of approximately correct diameter, treating the blank to harden the surface thereof generally to a desired depth but not throughout, removing the hardened surface portion from the blank except over the running surface thereof to provide a soft body portion, cutting an outer peripheral wire storage groove in the unhardened or soft body portion of the blank, removing a sector from the blank to form an incompletely annular ring, holding one end of the ring in a stationary position, and moving the other end in an arcuate path to stretch the soft body portion to permanently set the ring to a desired diameter while retaining its circularity.

3. Apparatus for altering the curvature of an incompletely annular ring without affecting the circularity thereof and comprising a stationary base member, a member rotatable therein, means secured to the base member to grip one end of an incompletely annular ring, means pivoted on the rotatable member to have free radial motion but not rotary motion relative thereto to grip the other end of the ring, and means to effect rotation of the rotatable member in the stationary member to set the ring to a desired diameter while retaining its circularity.

4. Apparatus for altering the curvature of an incompletely annular ring without affecting the circularity thereof and comprising a stationary base, a member rotatable therein, means secured to the stationary base to grip one end of an incompletely annular ring, means rotatable with the rotatable member and mounted thereon by a universal joint permitting a predetermined radial movement relative thereto and to grip the other end of the ring, and means for rotating the rotatable member in the stationary base to set the ring to a desired diameter while retaining its circularity.

5. Apparatus for altering the curvature of an incompletely annular ring without affecting the circularity thereof and comprising a stationary base, a hollow tubular member mounted therein, a shaft positioned coaxially within the tubular member and connected thereto by a universal joint to rotate therewith and to have predetermined radial movement relative to the hollow tubular member, a pair of radially relatively movable jaws on the stationary base to grip one end of an annularly incomplete ring, an arm rigidly secured to the said shaft and extending therefrom over the base, a pair of radially relatively movable jaws on the arm to grip the other end of the ring, and means to rotate the tubular member, the shaft and the arm to stretch the ring to a desired diameter while retaining the circularity thereof.

ROBERT PASH.